United States Patent
Weiss

(10) Patent No.: US 7,281,613 B2
(45) Date of Patent: Oct. 16, 2007

(54) INTERFACE DISC FOR A TORQUE AND/OR ROTATIONAL CONTROL APPARATUS

(75) Inventor: Kevin B. Weiss, Stillwater, MN (US)

(73) Assignee: Nexen Group, Inc., Vadnais Heights, MN (US)

( * ) Notice: Subject to any disclaimer, the term of this patent is extended or adjusted under 35 U.S.C. 154(b) by 163 days.

(21) Appl. No.: 11/055,671

(22) Filed: Feb. 8, 2005

(65) Prior Publication Data

US 2006/0175160 A1     Aug. 10, 2006

(51) Int. Cl.
B61H 5/00     (2006.01)

(52) U.S. Cl. ..................... 188/264 A; 188/17

(58) Field of Classification Search ............ 188/264 A, 188/17, 71.1, 218 XL, 18 A, 218 R, 264 R, 188/264 AA; 192/113.2, 113.23, 113.26
See application file for complete search history.

(56) References Cited

U.S. PATENT DOCUMENTS

| | | | |
|---|---|---|---|
| 2,115,763 A | 5/1938 | Burke | 192/113 |
| 2,627,325 A | 2/1953 | Helsten | 188/218 |
| 3,119,468 A | 1/1964 | Mossey | 188/73 |
| 3,263,783 A | 8/1966 | Sutaruk | 192/58 |
| 3,285,371 A | 11/1966 | Cadiou | 188/73 |
| 3,298,476 A | 1/1967 | Day | 188/218 |
| 3,394,780 A | 7/1968 | Hodkinson | 188/218 |
| 3,648,814 A | 3/1972 | Barron | 192/113 B |
| 3,805,935 A | 4/1974 | Armstrong | 192/113 A |
| 3,899,054 A | 8/1975 | Huntress et al. | 188/218 XL |
| 3,942,827 A | 3/1976 | Warlop et al. | 188/196 BA |
| 4,013,146 A | 3/1977 | Gebhardt et al. | 188/71.6 |
| 4,177,883 A | 12/1979 | Margetts | 188/218 XL |
| 4,222,465 A | 9/1980 | Haraikawa et al. | 188/73.5 |
| 4,288,942 A | 9/1981 | Nicholl | 46/74 |
| 4,289,216 A | 9/1981 | Shirai et al. | 188/72.2 |
| 4,392,559 A | 7/1983 | Oshima | 188/73.32 |
| 4,440,270 A | 4/1984 | Ross | 188/264 AA |
| 4,474,268 A | 10/1984 | Dayen | 188/71.5 |
| 4,534,454 A | 8/1985 | Brooks | 192/18 A |

(Continued)

FOREIGN PATENT DOCUMENTS

DE     2406133     8/1974

(Continued)

Primary Examiner—Pam Rodriguez
(74) Attorney, Agent, or Firm—Alan Kamrath; Kamrath & Associates P.A.

(57) ABSTRACT

A friction disc (16) for a torque and/or rotational control apparatus includes elongated and shortened fins (42, 43) upstanding between and equally circumferentially spaced intermediate first and second component discs (40, 41). The fins (42, 43) are free of circumferential interconnections to allow air to radially pass freely between the fins (42, 43). The fins (42, 43) extend in non-radial directions between the first and second component discs (40, 41). A mounting ring (48) is integrally formed with the elongated fins (42) intermediate and axially spaced from each component disc (40, 41) and radially inward of the inner edges (46) of the component discs (40, 41). The elongated fins (42) each includes a first elongated portion (42a) and a second shortened portion (42b) extending at an obtuse angle therefrom and on the mounting ring (48) radially inside of the inner edges (46). Windows (74) are formed in the mounting ring (48) radially inside of the component discs (40, 41) and of the elongated fins (42).

20 Claims, 3 Drawing Sheets

U.S. PATENT DOCUMENTS

| | | | |
|---|---|---|---|
| 4,535,873 A | 8/1985 | Airheart | 188/72.4 |
| 4,561,522 A | 12/1985 | Dayen | 188/71.6 |
| 4,621,715 A | 11/1986 | Denton | 188/264 R |
| 4,674,606 A | 6/1987 | Denton | 188/264 R |
| 4,772,299 A | 9/1988 | Bogusz | 55/385.3 |
| 4,811,822 A | 3/1989 | Estaque | 188/264 A |
| 4,830,150 A | 5/1989 | Denton | 188/218 R |
| 4,830,160 A | 5/1989 | Marshall | 192/70.12 |
| 4,846,315 A | 7/1989 | Dayen | 188/264 A |
| 4,853,574 A | 8/1989 | Estaque | 310/105 |
| 4,901,826 A | 2/1990 | Preiss | 188/264 A |
| 4,928,798 A | 5/1990 | Watson et al. | 188/218 XL |
| 4,950,035 A | 8/1990 | Villarreal et al. | 301/6 CS |
| 4,989,697 A | 2/1991 | Denton | 188/264 R |
| 5,109,960 A | 5/1992 | Gunther | 188/218 XL |
| 5,242,036 A | 9/1993 | Hennessy et al. | 188/71.6 |
| 5,284,230 A | 2/1994 | Takaki | 188/218 XL |
| 5,427,212 A | 6/1995 | Shimazu et al. | 188/218 XL |
| 5,492,205 A | 2/1996 | Zhang | 188/218 XL |
| 5,526,905 A | 6/1996 | Shimazu et al. | 188/218 XL |
| 5,706,915 A | 1/1998 | Shimazu et al. | 188/71.6 |
| 5,878,848 A | 3/1999 | Zhang | 188/218 XL |
| 6,260,669 B1 | 7/2001 | Daudi | 188/71.6 |
| 6,308,808 B1 | 10/2001 | Krenkel et al. | 188/218 XL |
| 6,367,599 B2 | 4/2002 | Kobayashi | 188/218 XL |
| 6,796,405 B2 | 9/2004 | Ruiz | 188/71.6 |
| 2003/0173166 A1 | 9/2003 | Garfinkel et al. | 188/264 A |
| 2006/0086579 A1* | 4/2006 | Gerber | 188/218 XL |

FOREIGN PATENT DOCUMENTS

| | | |
|---|---|---|
| DE | 3107025 | 2/1982 |
| EP | 1233201 | 8/2002 |
| FR | 1180373 | 6/1959 |
| FR | 2864719 | 7/2005 |
| GB | 1096633 | 12/1967 |
| GB | 1371158 | 10/1974 |
| GB | 1399855 | 7/1975 |
| GB | 1421952 | 1/1976 |
| GB | 2024966 | 1/1980 |
| GB | 2108238 | 5/1983 |

* cited by examiner

INTERFACE DISC FOR A TORQUE AND/OR ROTATIONAL CONTROL APPARATUS

BACKGROUND

The present invention relates generally to an interface device for a torque and/or rotational control apparatus such as clutches or brakes, and most particularly to an interface disc for a torque and/or rotational control apparatus having greatly increased heat dissipation.

It is a continuous problem to provide clutches or brakes which are efficient, have high ability to transfer the heat energy generated in the engagement process and/or in a constant slipping arrangement, and are easy to maintain and operate. U.S. Pat. No. 4,474,268 shows one type of apparatus designed to solve this problem and particularly is an external, multi-caliper brake arranged to provide controlled torque to a shaft including a hub arranged to be mounted to this shaft. A longitudinally centrally located, internally finned friction disc is in turn mounted to the hub. It can be appreciated that the capacity of the brake is dependent on the dissipation of heat which in turn is dependent upon air flow. The friction disc described provides increased cooling and increased brake efficiency by a finned arrangement. Specifically, the friction disc is formed of two, opposed, interlaced, finned portions to create a serpentine, radial and circumferential air cooling path for the friction disc and provide better heat transfer and increased brake efficiency. Although the apparatus of U.S. Pat. No. 4,474,268 showed a marked increase from prior apparatus in the ability to transfer the heat energy generated in the engagement process, further efforts were continued to improve capacity and efficiency including the utilization of cooling enhancing devices such as of the type taught in U.S. Pat. Nos. 4,561,522 and 4,846,315.

To optimize thermal dissipation, manufacturers ordinarily design friction discs that will rotate in a predicted direction. This predicted direction will allow for designs that optimize the flow of air through the fins. Using design concepts similar to those used by turbines drawing in air and then accelerating it radially outward, designers have developed friction discs with curved, separated, angled, and closed bodies to optimize the transfer of energy from the disc surfaces to the air.

The thermal efficiency of these turbine friction discs has excelled greatly due to techniques in CFD (computational fluid dynamics). By using computers to test models for air volume, speed, and turbulence, great strides have be made in the prediction of thermal performance. U.S. Pat. No. 5,242,036 shows one type of friction disc with angled fins designed to optimize the flow of air and which has enjoyed considerable commercial success.

However, prior flow optimizer friction discs have a downside. Although the efficiency is increased in one direction, when the friction disc is rotated in the opposite direction, the efficiency is greatly reduced. The movement of air inside the fins is retarded. This unwanted product of design efficiency forces the manufacturer to design two versions of the same rotor, one for each direction of rotation.

Thus, even with the development of friction discs having enhanced capabilities, the need and problem continue to provide friction discs with even greater ability to transfer the heat energy generated in the engagement process and/or in a constant slipping arrangement and which overcome the deficiencies of the prior art.

SUMMARY

The present invention solves these needs and other problems in the field of interface discs for torque and/or rotational control apparatus by providing, in a preferred form, increased amount of air movement through the apparatus. An improved interface disc is provided including elongated fins upstanding between and circumferentially spaced intermediate the inner surfaces of first and second component discs. All of the radially inner and outer ends of the elongated fins are free of circumferential interconnection to allow air to radially pass freely between the fins.

In one aspect of the present invention, a mounting ring is integrally formed with the elongated fins intermediate and separated and axially spaced from each of the first and second component discs and radially inward of the inner edges from each of the first and second component discs. The elongated fins extend in non-radial directions, with the same interface disc adapted to be mounted in an orientation according to the operational direction of rotation.

In preferred forms, windows are formed in the mounting ring radially inward of the inner edges of the first and second component discs and the elongated fins.

In other preferred forms, the mounting ring has an outer edge which is at the same radial extent as the inner edges of each of the first and second component discs and most preferably with the elongated fins extending radially inward of the inner edges of each of the first and second component discs.

In another aspect of the present invention, the elongated fins extend radially inward of at least one of the inner edges of each of the first and second component discs and most preferably include linear elongated portions within the radial extent of the first and second component discs and linear shortened portions extending from the elongated portions and radially inward of the inner edges of each of the first and second component discs.

The present invention provides a more efficient interface disc for a torque and/or rotational control apparatus.

Further, the present invention provides an interface disc for a torque and/or rotational control apparatus having increased heat transfer characteristics.

The present invention provides an interface disc for a torque and/or rotational control apparatus which has increased overall efficiency.

Further, the present invention provides an interface disc for a torque and/or rotational control apparatus which has increased overall cooling characteristics.

These and further objectives and advantages of the present invention will become clearer in the light of the following detailed description of an illustrative embodiment of this invention described in connection with the drawings.

DESCRIPTION OF THE DRAWINGS

The illustrative embodiment of the present invention may best be described by reference to the accompanying drawings where.

Figure 1:
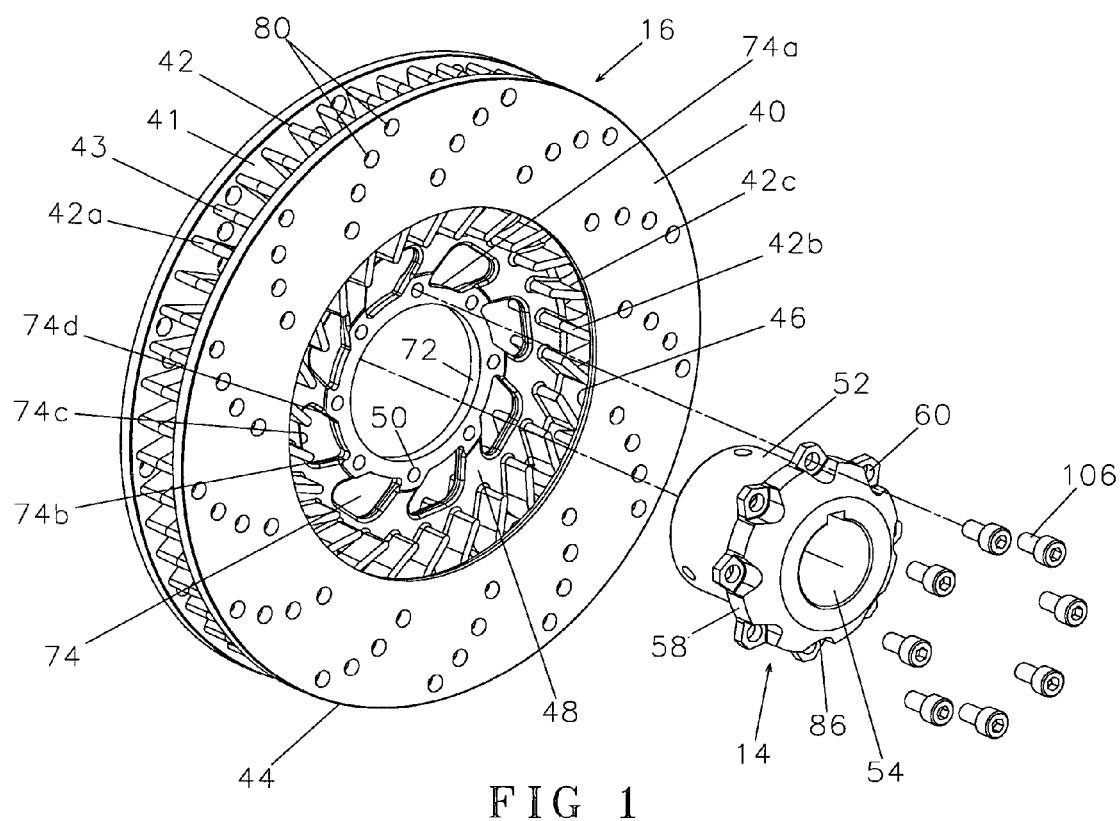
FIG. 1 is an exploded, perspective view of a friction disc and hub constructed according to the preferred teachings of the present invention.
Figure 2:
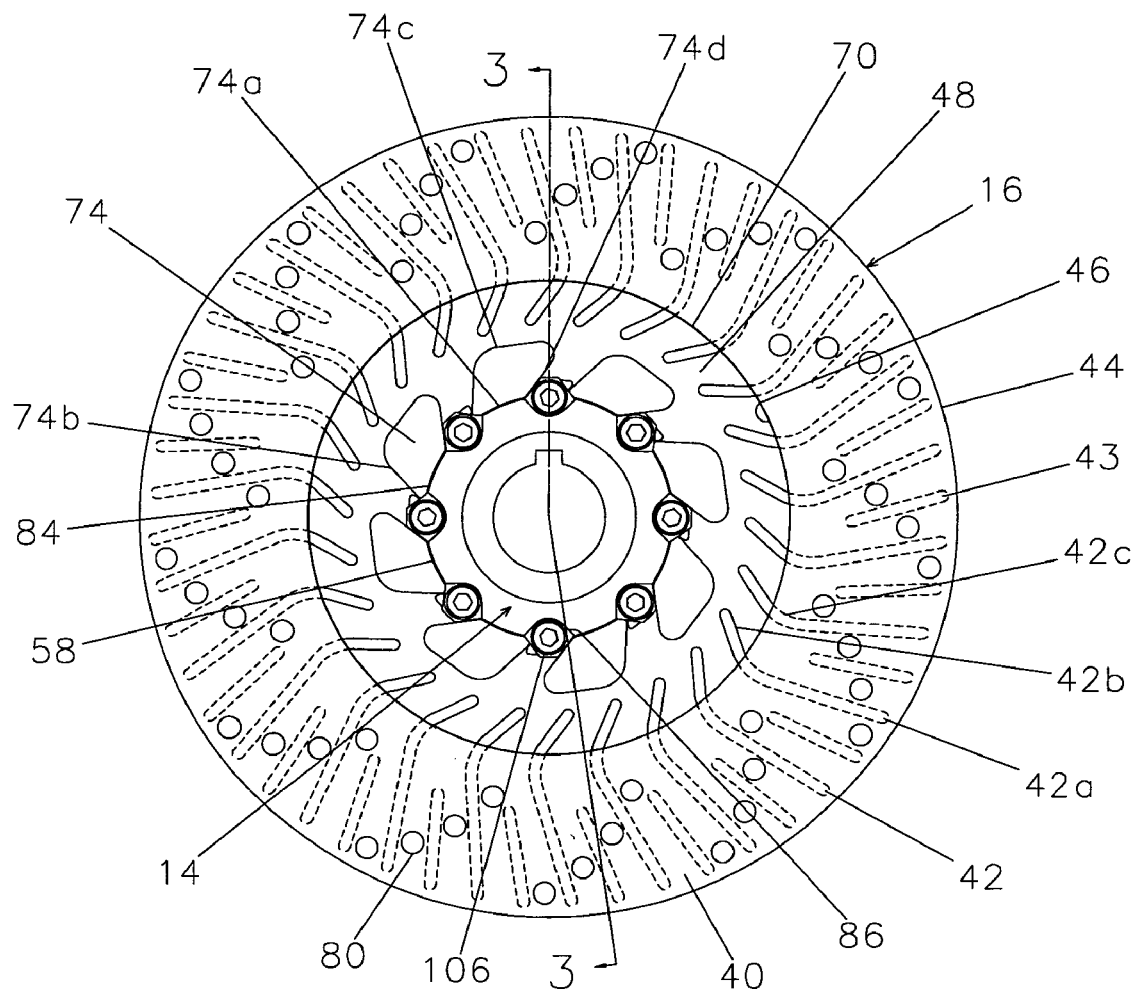
FIG. 2 is a plan view of the friction disc and hub of FIG. 1 in an assembled condition.
Figure 3:
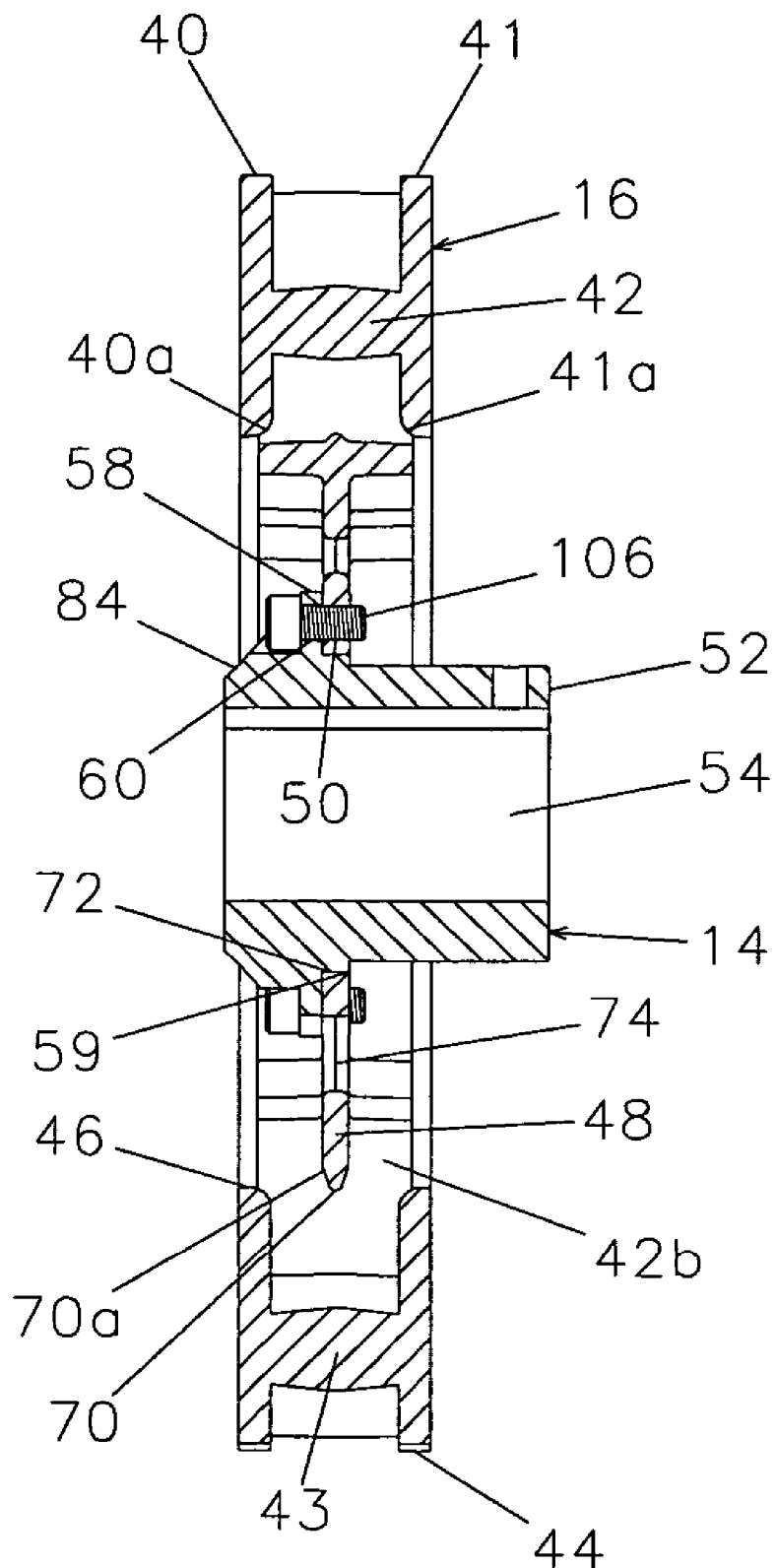
FIG. 3 is a cross-sectional view of the friction disc and hub of FIG. 1 according to section lines 3-3 of FIG. 2.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "end", "side", "radially", "axially", "inner", "outer", "outward", and similar terms are used herein, it should be understood that these terms have reference only to the structure shown in the drawings as it would appear to a person viewing the drawings and are utilized only to facilitate describing the invention.

DESCRIPTION

An interface disc according to the preferred teachings of the present invention is shown in the drawings as a friction disc and is generally designated 16. Friction disc 16 can be utilized with any type of torque and/or rotational control apparatus including but not limited to those of the types shown and described in U.S. Pat. Nos. 4,474,268 and 5,242,036, which are incorporated herein by reference. Such apparatus control rotation of a rotatable member such as a shaft by exerting a force on the rotatable member such as a braking force to slow or stop rotation of the rotatable member, a clutching force to accelerate and/or rotatably relate rotation of the rotatable member with a drive, or the like. Such apparatus are often intended to be applied in environments where the rotatable member will primarily rotate in a single direction and where rotation in the opposite direction is prevented or restricted such as in speed and/or duration.

Friction disc 16 according to the preferred teachings of the present invention is of a finned configuration and is longitudinally centrally arranged in the torque and/or rotational control apparatus. In particular, friction disc 16 in the embodiment shown is in the form of a single integral component including first and second, spaced, planar discs 40 and 41 having circumferentially spaced fins 42 and 43 projecting perpendicularly between and integrally connecting discs 40 and 41. Each disc 40 and 41 has an outer edge or periphery 44 and an inner circumference or edge 46.

Fins 42 are relatively thin and flat members upstanding between the inner surfaces of discs 40 and 41 and have a length greater than the radial length or distance between edges 44 and 46. In the preferred form, fins 42 are spaced and have a length to extend to but spaced inwardly of edge 44. Fins 42 are equally circumferentially spaced around and between discs 40 and 41 and are free of circumferential interconnection to allow air to radially pass freely between circumferentially adjacent fins 42. In the preferred form shown, fins 42 have an equal length.

Fins 42 each include a first elongated portion 42a and a second shorter portion 42b. Portions 42a and 42b are interconnected at an interconnection 42c and extend at an obtuse angle in the order of 130° from each other. Portions 42a and 42b are each linearly straight. Portion 42a has a length generally equal to but slightly less than the radial length or distance between edges 44 and 46. Portion 42b is considerably shorter than portion 42a and in the preferred form has a length generally equal to less than 50% of the length of portion 42a. Interconnections 42c are in the form of arcs intermediate portions 42a and 42b and are located between discs 40 and 41 and generally closely adjacent to edges 46. Portions 42b extend radially inwardly from interconnections 42c at an acute angle in the order of 30° from a radial plane extending perpendicular to the rotational axis. Likewise, portions 42a extend radially outwardly from interconnections 42c at an angle in order of 20° from a radial plane extending perpendicular to the rotational axis.

Fins 43 are relatively thin and flat members upstanding between discs 40 and 41 and have a length shorter than portions 42a of fins 42 and shorter than the radial length or distance between edges 44 and 46 and in the preferred form have a length approximately equal to 55% of the radial distance between edges 44 and 46 and approximately 75% of the length of portion 42a of fins 42. The thickness of fins 42 and 43 are equal. The radially outer ends of fins 43 are located at the same radial extent as the radially outer ends of fins 42. In the most preferred form, a single fin 43 is equally circumferentially spaced between circumferentially adjacent fins 42. All of fins 43 are free of circumferentially interconnections with each other and with fins 42 to allow air to radially pass freely between circumferentially adjacent fins 42 and 43. Further, in the preferred form, fins 43 have an equal length.

Friction disc 16 according to the preferred teachings of the present invention further includes a mounting ring 48 located parallel to and intermediate and separate from discs 40 and 41 and integrally formed with fins 42. Fins 42 project perpendicularly to and on opposite sides of mounting ring 48. Mounting ring 48 has an outer edge or periphery 70 and an inner circumference or edge 72. In the preferred form, mounting ring 48 is in the form of a single, circumferentially continuous planar disc between edges 70 and 72 and having a thickness less than discs 40 and 41. Edge 72 has a diameter less than the diameter of edge 46 such that mounting ring 48 extends radially inwardly of discs 40 and 41. Periphery 70 in the most preferred form has a diameter generally equal to the diameter of edge 46 and is formed such that its radial extent is generally equal to edge 46 of discs 40 and 41. A plurality of threaded mounting bores 50 are formed at regular intervals in mounting ring 48 adjacent to edge 72.

According to the preferred teachings of the present invention, a plurality of axially extending windows 74 are provided equally circumferentially spaced in mounting ring 48 to allow air flow between opposite sides of mounting ring 48 during rotation. In the most preferred form, windows 74 are located radially outward of edge 72, radially inward of periphery 70 and of the radially inner ends of fins 42, and circumferentially spaced between bores 50. In the most preferred form, windows 74 are generally trapezoidal in shape and include an arched inner edge 74a having a radius generally equal to that of the locations of the centers of bores 50. Windows 74 each further include a leading side edge 74b which is linearly straight and angling in the same direction as portions 42b but at a slightly smaller angle from a radial plane extending perpendicular to the rotational axis and in particular at an angle in the order of 25° from a radial plane extending perpendicular to the rotational axis. An outer window edge 74c is linearly straight and extends generally perpendicular to leading side edge 74b. A trailing side edge 74d is linearly straight and extends at an acute angle to outer window edge 74c and at an angle in the order of 40° from a radial plane extending perpendicular to the rotational axis. In the preferred form, the interconnections between arched inner edge 74a and side edges 74b and 74d and between outer window edge 74c and side edges 74b and 74d are arch shaped. The radial distance between edges 74a and 74c is substantially less than and in the most preferred form less than 50% of the radial distance between periphery 70 and edge 72.

According to the preferred teachings of the present invention, periphery 70 of mounting ring 48 includes first and second taper surfaces 70a on opposite sides thereof. In particular, taper surfaces 70a originate at edge 70 at less than half its thickness, have increasing axial spacing with decreasing radial extent and terminate at the opposite side surfaces of mounting ring 48. In the most preferred form, surfaces 70a extend an angle in the order of 15° from a radial plane extending perpendicular to the rotational axis.

Similarly, according to the preferred teachings of the present invention, arched surfaces 40a and 41a are provided between edge 46 and the radially inner surfaces of discs 40 and 41. In the most preferred form, arched surfaces 40a and 41a have a radius generally equal to 66% (sixty-six percent) of the thickness of discs 40 and 41.

In the most preferred form, a plurality of a series of radially and circumferentially spaced apertures 80 are provided through discs 40 and 41. Apertures 80 are axially aligned in discs 40 and 41 and in the most preferred form have a diameter generally equal to the circumferential distance between fins 42 and 43. Apertures 80 are located intermediate each of fins 42 and 43 in the form shown and are radially spaced at intervals generally equal to the diameter of apertures 80. The first radially inward aperture 80 of the series is located adjacent to fin 42 at the radially inner extent of fin 43. The last radially outward aperture 80 of the series is located adjacent to fins 42 and 43 at the radially outer ends thereof. Thus, each of the series of apertures 80 spiral outwardly in the direction of rotation.

Friction disc 16 can be formed of any suitable castable and machinable material including but not limited to iron. However, in the most preferred form, friction disc 16 is formed from a MMC (metal matrix composite) material such as ceramic particles upwards of 30% by volume in a matrix or binder such as aluminum. The ceramic particles reinforce friction disc 16 and allow the use of lightweight but less tolerant material such as aluminum in demanding applications such as braking. Friction disc 16 formed of MMC material has a mass of approximately one third that of when formed of iron, which lowers the mass moment of inertia which is particularly advantageous in tension control applications. However, friction discs 16 formed of MMC material should be limited to applications having known temperature limits acceptable for such use.

Suitable provisions are utilized to attach friction disc 16 to the rotatable member desired to be controlled. In the most preferred form when the rotatable member is in the form of a shaft, a hub 14 can be utilized to connect the shaft to friction disc 16. Hub 14 includes a generally cylindrical portion 52 having a centrally located bore 54 for slideable receipt upon the shaft. Hub 14 further includes a radially extending flange 58 having a plurality of mounting bores 60 at regular circumferential intervals corresponding to bores 50 of friction disc 16. Hub 14 further includes a pilot shoulder 59 axially extending from flange 58 for slideable receipt of mounting ring 48 of friction disc 16, with shoulder 59 having an axial extent generally equal to the thickness of mounting ring 48. Friction disc 16 is connected to hub 14 by bolts 106 passing through bores 60 and threaded in bores 50. It can be appreciated that the orientation of hub 14 relative to friction disc 16 can be chosen according to the desired operational rotation direction of friction disc 16.

According to the teachings of the present invention, hub 14 includes a radiused deflector 84 at the forward end of cylindrical portion 52. In particular, deflector 84 is located on the opposite side of flange 58 than pilot shoulder 59 and is in the form of a concave inwardly extending arch extending from the radially outer edge of flange 58 to the axial end of cylindrical portion 52. The radially outer edge of flange 58 includes radially extending tabs 86 including bores 60, and flange 58 and deflector 84 include scallops at corresponding locations for countersinking the heads of bolts 106.

It can further be appreciated that the rotatable member for which the torque and/or rotation is controlled being formed of two pieces, i.e., hub 14 and friction disc 16, is particularly advantageous. First, hub 14 can be positioned on the shaft permanently, and friction disc 16 can be replaced when worn out without disturbing the position of hub 14 on the shaft. This allows the user to easily remount friction disc 16 in position and eliminates costly set-up time. Further, hub 14 and friction disc 16 can be made of different materials for greater efficiency of heat transfer to the air stream and allowing less heat to conduct into the shaft. Also, a thermal insulator (such as a gasket) can be placed at the interconnection between hub 14 and friction disc 16 to further reduce the heat conducted to the shaft.

However, hub 14 could take other forms according to the teachings of the present invention. As an example, hub 14 could be formed in a manner that does not have a preferred orientation according to the direction of rotation. In that case, hub 14 could be formed integrally as a single component with mounting ring 48 and friction disc 16.

With the foregoing, subleties and novel differences of hub 14 and friction disc 16 of the present invention can be explained and understood. Particularly, hub 14 and friction disc 16 provide a greatly increased amount of air to move through hub 14 and friction disc 16 than through comparable prior designs, with increased air resulting in greater heat dissipation, in turn resulting in greater apparatus capacity. Specifically, in its most preferred form, hub 14 and friction disc 16 include a combination of unique features providing the synergistic enhancement of the amount of air movement.

In regard to the preferred aspects of the present invention, the use of shortened fins 43 of a short length in comparison to the radial extent of discs 40 and 41 placed intermediate elongated fins 42 in comparison to the radial extent of discs 40 and 41 insures that air input between edges 46 of discs 40 and 41 is not physically blocked by the radially inner ends of fins 42 while still maximizing impeller surface area. Specifically, the radially inner ends of fins 42 are sufficiently circumferentially spaced from each other so as to not detrimentally physically obstruct air passage between discs 40 and 41 throughout the entire circumference but still provide impeller surface area for impeller efficiencies in drawing air between and through discs 40 and 41. Similarly, the radially outer ends of fins 42 and 43 provide impeller surface area for impeller efficiency in drawing air between and through discs 40 and 41.

Furthermore, as air includes both a radial component of movement as it travels radially between fins 42 and 43 and a circumferential component of movement due to the rotation of friction disc 16 secured to the shaft, the orientation of fins 42 and 43 with respect to the radial enhances impeller efficiency.

Similarly, hub 14 according to the preferred teachings of the present invention also increases airflow by directing air. As air approaches hub 14, the motion of the air is mainly coincident to the rotation axis. The air must than make a transition from axial flow to radial. This causes flow to suffer because of the 90-degree change in direction. To aid in this directional change, radiused deflector 84 according to the preferred teachings of the present invention has a shape, along with its close proximity to the intermediate mounting surface, which allows the air to make the 90-degree transition. This will increase overall airflow.

Additionally, friction disc 16 is symmetrical about an intermediate radial plane extending perpendicular to the rotational axis according to the preferred teachings of the present invention. This feature allows the same thermally optimized friction disc 16 to be mounted in an orientation corresponding to operational rotation and thus avoids worry of efficiency reduction associated with radially oriented fins. Thus, it is necessary to create only one part, therefore optimizing volumes, reducing costs (in tooling and production) and simplifying the product line. Such cost reduction allows the use of MMC material in the formation of friction disc 16 while still remaining market competitive with friction discs 16 formed of iron.

Further, improvement of the thermal efficiency of friction disc 16 utilizes windows 74 in mounting ring 48 according to the preferred teachings of the present invention that allow fluid transfer between both sides of friction disc 16. Specifically, if friction disc 16 is mounted in an application where there is shrouding caused by the machine configuration, this shrouding will result in a loss of air supply and/or will cause an imbalance in pressures from one side to the other of friction disc 16. Thus, thermal efficiency would suffer. Windows 74 according to the preferred teachings of the present invention avoids any pressure differentials and maximizes air supply available in the particular application. Furthermore, it is believed that the shape of windows 74 according to the preferred teachings of the present invention as shown and described provide synergistic air passage.

Furthermore, taper surfaces 70a according to the preferred teachings of the present invention recombine the layers of flowing air between fins 42 and 43 of friction disc 16. Suppressing turbulence and aiding in reconnection speed the flow of air and increase thermal efficiency. Also, the transition of flowing air is aided by arched surfaces 40a and 41a at the innermost radial point of discs 40 and 41 and specifically allow for a smooth transition of the air when entering between fins 42 and 43 of friction disc 16.

Additionally, apertures 80 according to the preferred teachings of the present invention allow air intake through discs 40 and 41 when located intermediate caliper elements. Increased air flow increases thermal capacity. Also, apertures 80 also relieve any out gassing of friction material of the calipers.

Still further, fin portions 42b extend in an inwardly radial direction beyond edges 46 according to the preferred teachings of the present invention. These extended fin portions 42b are not shrouded by discs 40 and 41 and increase thermal efficiency. The increases are twofold. Specifically, fin portions 42b increase surface area greatly. The surface area of any energy-dissipating product will result in faster energy transfer. Also, the angle of fin portions 42b and their extension beyond discs 40 and 41 act as a transition area to capture and redirect air as it approaches the inner axial extents of discs 40 and 41. This also increases overall airflow according to the preferred teachings of the present invention.

Now that the basic teachings of the present invention have been explained, many extensions and variations will be obvious to one having ordinary skill in the related technologies. For example, although shown and described including a combination of several novel features believed to produce synergistic results, such features can be utilized in hubs 14 and friction discs 16 singly or in other combinations according to the teachings of the present invention.

Further, although the present invention has been described with respect to a shaft to be rotationally controlled, it is now clear that the present invention is general in application and therefore provides rotational control between various members, including shafts and hubs, or hubs and hubs, or hubs and shafts, or other like combinations, and it does not matter which is a stationary member and which is desired to be rotationally controlled with respect to the other.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. For an apparatus for controlling torque and/or rotation of a member about an axis, an interface disc for rotation about the axis in an operational direction comprising, in combination: first and second component discs having inner edges, outer edges, inner surfaces, and outer, interface surfaces; a plurality of elongated fins upstanding between the inner surfaces of the first and second component discs and having radially inner ends and radially outer ends, with all of the radially inner and outer ends of the elongated fins being free of circumferential interconnection, with air being allowed to radially pass freely between circumferentially adjacent elongated fins between the inner and outer edges of the first and second component discs, with the elongated fins being equally circumferentially spaced and extending in non-radial directions between the first and second component discs; and a mounting ring integrally formed with the elongated fins intermediate and axially spaced from each of the first and second component discs and radially inward of the inner edges of the first and second component discs.

2. The interface disc of claim 1 wherein the radially inner ends of the plurality of elongated fins are radially inward of the inner edges of the first and second component discs.

3. The interface disc of claim 2 wherein the mounting ring includes an inner edge and an outer edge, with the outer edge of the mounting ring having a radial extent generally equal to the inner edges of the first and second components discs.

4. The interface disc of claim 3 wherein the mounting ring is formed as a single, circumferentially continuous component between the inner and outer edges of the mounting ring.

5. The interface disc of claim 3 with the mounting ring including opposite side surfaces, with first and second taper surfaces originating at the outer edge of the mounting ring, having increasing axial spacing with decreasing radial extent and terminating in the opposite side surfaces to recombine air flows from the opposite side surfaces of the mounting ring between the inner surfaces of the first and second component discs and between the plurality of elongated fins; and with the first and second component discs each including an arched surface between the inner edge and the inner surface to provide a smooth transition of air when entering between the inner surfaces of the first and second component discs and between the plurality of elongated fins.

6. The interface disc of claim 2 further comprising, in combination: a plurality of axially extending windows located in the mounting ring, with the axially extending windows allowing air passage during rotation of the interface disc.

7. The interface disc of claim 6 with each of the plurality of axially extending windows located radially inward of the radially inner ends of the plurality of elongated fins.

8. The interface disc of claim 7 with each of the plurality of axially extending windows including an arched inner edge, a leading side edge extending from the arched inner edge at a non-radial angle, an outer window edge extending generally perpendicular to the leading side edge, and a trailing side edge extending at an acute angle to the outer window edge and extending to the arched inner edge, with the outer window edge having a circumferential length generally equal to double a circumferential spacing between the radially inner ends of the circumferentially adjacent elongated fins.

9. The interface disc of claim 2 wherein each of the plurality of elongated fins include a first elongated portion and a second shorter portion extending at an obtuse angle from the first elongated portions in the operational direction.

10. The interface disc of claim 9 wherein the first elongated portion of each of the plurality of elongated fins extends from the outer edge to adjacent the inner edge of the first and second component discs, and the second shortened portion extends radially inward of the inner edge of the first and second component discs.

11. The interface disc of claim 10 further comprising, in combination: a first, shortened fin equally circumferentially spaced between each pair of circumferentially adjacent elongated fins and upstanding between the inner surfaces of the first and second components discs and having radially inner ends and radially outer ends, with the length between the radially inner ends and the radially outer ends of the shortened fins being substantially shorter than the radial length between the inner and outer edges of the component discs and the length of the elongated fins, with all of the radially inner and outer ends of the shortened fins being free of circumferential interconnection.

12. The interface disc of claim 11 wherein the radially inner ends of the elongated fins are located radially inward of the inner edge of the first and second component discs and of the second shortened portions of the elongated fins.

13. The interface disc of claim 12 wherein the radially outer ends of the elongated and shortened fins are located at the same radial extent.

14. The interface disc of claim 13 wherein the length of the shortened fins is generally equal to seventy-five percent the length of the first elongated portions of the elongated fins.

15. The interface disc of claim 12 with the mounting ring having a thickness less than each of the component discs; with the interface disc further comprising, in combination: a hub including a generally cylindrical portion, a flange integrally extending radially from the cylindrical portion, a pilot shoulder integrally and axially extending from the flange, and a radiused deflector integrally extending from the flange opposite to the pilot shoulder to the cylindrical portion, with the pilot shoulder being of a size for slideable receipt of the mounting ring of material and having an axial extent generally equal to the thickness of the ring of material, with the mounting ring connected to the flange, with the radiused deflector being in the form of a concave inwardly extending arch to redirect air flow in a direction parallel to the axis to perpendicular to the axis.

16. The interface disc of claim 12 further comprising, in combination: a plurality of a series of radially spaced apertures axially extending through each of the first and second component discs, with the apertures in the series of apertures being circumferentially spaced by one of the elongated fins and the shortened fins, with only one of the radially spaced apertures located between adjacent elongated and shortened fins.

17. For an apparatus for controlling torque and/or rotation of a member about an axis, an interface disc for rotation about the axis in an operational direction comprising, in combination: first and second component discs having inner edges, outer edges, inner surfaces, and outer, interface surfaces; a plurality of elongated fins upstanding between the inner surfaces of the first and second component discs and having radially inner ends and radially outer ends, with all of the radially inner and outer ends of the elongated fins being free of circumferential interconnection, with air being allowed to radially pass freely between circumferentially adjacent elongated fins between the inner and outer edges of the first and second component discs, with the elongated fins being equally circumferentially spaced and extending in non-radial directions between the first and second component discs to define extensions radially inward of the inner edges; wherein the radially inner ends of the plurality of elongated fins are radially inward of the inner edges of the first and second component discs; wherein each of the plurality of elongated fins each include a first elongated portion and a second shorter portion extending at an obtuse angle from the first elongated portion in the operational direction, with the extensions of the elongated fins being free of shrouding allowing transition of air axially between the extensions between the radially inner ends of the plurality of elongated fins and the inner edges of the first and second component discs.

18. The interface disc of claim 17 wherein the first elongated portion of each of the plurality of elongated fins extends from the outer edge to adjacent the inner edge of the first and second component discs, and the second shortened portion extends radially inward of the inner edge of the first and second component discs.

19. The interface disc of claim 18 further comprising, in combination: a first, shortened fin equally circumferentially spaced between each pair of circumferentially adjacent elongated fins and upstanding between the inner surfaces of the first and second components discs and having radially inner ends and radially outer ends, with the length between the radially inner ends and the radially outer ends of the shortened fins being substantially shorter than the radial length between the inner and outer edges of the component discs and the length of the elongated fins, with all of the radially inner and outer ends of the shortened fins being free of circumferential interconnection.

20. The interface disc of claim 19 further comprising, in combination: a plurality of a series of radially spaced apertures axially extending through each of the first and second component discs, with the apertures in the series of apertures being circumferentially spaced by one of the elongated fins and the shortened fins, with only one of the radially spaced apertures located between adjacent elongated and shortened fins.

* * * * *